(12) United States Patent
Hsiao et al.

(10) Patent No.: US 7,816,895 B2
(45) Date of Patent: Oct. 19, 2010

(54) POWER SUPPLYING DEVICE (75) Inventors: Yi-Chou Hsiao, Taipei (TW);
Wen-Sheng Chen, Taipei (TW)

(73) Assignee: Lite-On Technology Corp., Taipei (TW)

( * ) Notice: Subject to any disclaimer, the term of this patent is extended or adjusted under 35 U.S.C. 154(b) by 300 days.

(21) Appl. No.: 12/216,264

(22) Filed: Jul. 2, 2008

(65) Prior Publication Data

US 2009/0175055 A1 Jul. 9, 2009

(30) Foreign Application Priority Data

Jan. 7, 2008 (TW) .............................. 97100561 A (51) Int. Cl.
*G05F 1/577* (2006.01)
*H02M 3/335* (2006.01)

(52) U.S. Cl. ................. 323/267; 363/21.04; 363/21.12; 363/90

(58) Field of Classification Search ................. 323/267, 323/361; 307/17; 363/15, 16, 20, 21.04, 363/21.08, 21.12, 21.16, 90, 93
See application file for complete search history.

(56) References Cited

U.S. PATENT DOCUMENTS 4,419,723 A * 12/1983 Wilson, Jr. ............... 363/21.12
4,967,335 A * 10/1990 Konopka ..................... 363/82
5,363,323 A * 11/1994 Lange ..................... 363/21.09
6,128,203 A * 10/2000 Canizales Teran ....... 363/21.06

* cited by examiner

*Primary Examiner*—Gary L Laxton
(74) *Attorney, Agent, or Firm*—Rosenberg, Klein & Lee (57) ABSTRACT

A power supplying device includes: an output transformer including first and second output coils for generating first intermediate voltages from an input voltage; a voltage adjusting transformer including primary and secondary coils; a first rectifying-and-filtering circuit connected to the first output coil for generating a first output voltage from the first intermediate voltage obtained from the first output coil; the primary coil being connected in parallel to the first output coil, the secondary coil being connected in series to the second output coil and being coupled to the primary coil for generating a second intermediate voltage from the first intermediate voltage obtained from the first output coil; and a second rectifying-and-filtering circuit connected to the secondary coil for generating a second output voltage from a combined voltage combining the second intermediate voltage obtained from the secondary coil with the first intermediate voltage obtained from the second output coil.

12 Claims, 7 Drawing Sheets

POWER SUPPLYING DEVICE

CROSS-REFERENCE TO RELATED APPLICATION

This application claims priority of Taiwanese Application No. 097100561, filed on Jan. 7, 2008.

BACKGROUND OF THE INVENTION

1. Field of the Invention

The invention relates to a power supplying device, more particularly to a power supplying device capable of providing adjustable output voltages.

2. Description of the Related Art

Since internal components of most electronic devices, such as televisions, monitors, stereo systems, computers, etc., require different direct-current (DC) voltages, a switching power supplying device capable of converting a DC input voltage into various DC output voltages is used in the electronic devices so as to supply the various DC output voltages respectively to the internal components of the electronic devices.

Figure 1:
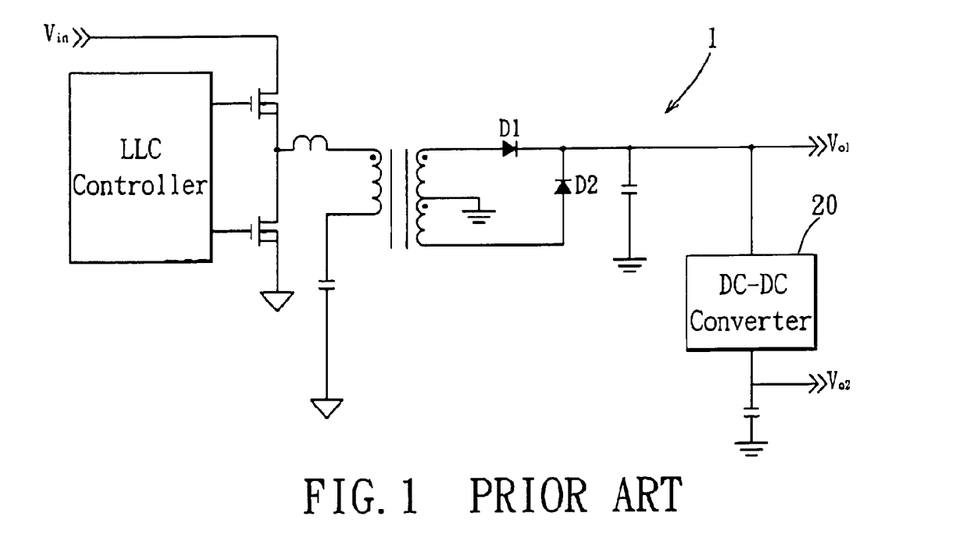
FIG. 1 is a schematic circuit diagram of a conventional LLC half-bridge power supplying device that utilizes a DC-DC converter.
Figure 2:
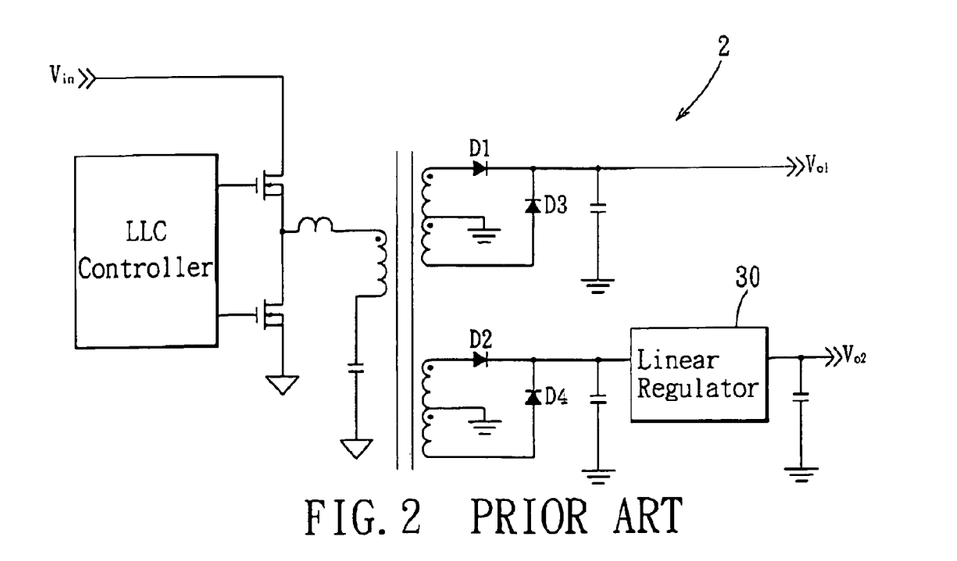
FIG. 2 is a schematic circuit diagram of another conventional LLC half-bridge power supplying device that utilizes a linear regulator.

However, differences are usually present between the actual DC output voltages and the voltages required by the internal components due to an excessively large induced voltage at each output coil of an output transformer used in a conventional switching power supplying device. Normally, each output coil has an induced voltage that ranges from 1.5V to 6V depending on the circuit configuration and design parameters. Therefore, the conventional switching power supplying device requires an additional component for adjusting the output voltages thereof so as to comply with the voltages required by the internal components of the electronic device. For instance, a conventional LLC half-bridge power supplying device 1 as shown in FIG. 1 requires an additional DC to DC (DC-DC) converter 20. As another example, another conventional LLC half-bridge power supplying device 2 as shown in FIG. 2 requires an additional linear regulator 30.

For detailed circuitry of a conventional DC-DC converter, one may refer to the controller specification of model no. LTC1624 available from LINEAR TECHNOLOGY. An example of a conventional linear regulator is model no. LM117QML available from National Semiconductor.

However, the DC-DC converter not only involves complicated circuitry and is costly, but radiation problems such as radio frequency interference (RFI) are also easily generated therein. On the other hand, the linear regulator can only be used for reducing voltages, and power converting efficiency thereof is poor, especially when a difference between the input voltage and the output voltage is large. In addition, since voltage level of the input voltage exceeding the output voltage is consumed in the form of heat energy, this voltage level cannot be applied to an output circuit, and an external heat-dissipating mechanism is even required to accelerate heat dissipation.

SUMMARY OF THE INVENTION

Therefore, an object of the present invention is to provide a power supplying device that has a relatively high power converting efficiency, that has a relatively simple circuitry, that is relatively low cost, and that provides adjustable output voltages.

According to one aspect of the present invention, there is provided a power supplying device adapted for converting an input voltage into at least one output voltage. The power supplying device includes an output transformer, first and second rectifying-and-filtering circuits, and a voltage adjusting transformer. The output transformer includes an input coil unit that is adapted for receiving the input voltage, and first and second output coil units. Each of the first and second output coil units is coupled electromagnetically to the input coil unit, and is adapted for generating a respective first intermediate voltage from the input voltage. The voltage adjusting transformer includes a primary coil unit and a secondary coil unit.

The first rectifying-and-filtering circuit is connected electrically to the first output coil unit of the output transformer, and is adapted for rectifying and filtering the first intermediate voltage obtained from the first output coil unit into a first output voltage. The primary coil unit of the voltage adjusting transformer is connected in parallel to the first cutout coil unit of the output transformer. The secondary coil unit of the voltage adjusting transformer is connected in series to the second output coil unit of the output transformer, and is coupled electromagnetically to the primary coil unit so as to generate a second intermediate voltage from the first intermediate voltage obtained from the first output coil unit. The second rectifying-and-filtering circuit is connected to the secondary coil unit of the voltage adjusting transformer for rectifying and filtering a combined voltage that combines the second intermediate voltage obtained from the secondary coil unit with the first intermediate voltage obtained from the second output coil unit into a second output voltage.

According to another aspect of the present invention, there is provided a power supplying device adapted for converting an input voltage into an output voltage. The power supplying device includes an output transformer, a rectifying-and-filtering circuit, and a voltage adjusting transformer. The output transformer includes an input coil unit that is adapted for receiving the input voltage, and an output coil unit coupled electromagnetically to the input coil unit and adapted for generating a first intermediate voltage from the input voltage. The voltage adjusting transformer includes a primary coil unit connected in parallel to the output coil unit of the output transformer, and a secondary coil unit connected in series between the output coil unit of the output transformer and the rectifying-and-filtering circuit, and coupled electromagnetically to the primary coil unit so as to generate a second intermediate voltage from the first intermediate voltage obtained from the output coil unit.

The rectifying-and-filtering circuit rectifies and filters a combined voltage that combines the second intermediate voltage obtained from the secondary coil unit with the first intermediate voltage obtained from the output coil unit into a second output voltage.

According to yet another aspect of the present invention, there is provided a power supplying device adapted for converting an input voltage into at least one output voltage. The power supplying device includes an output transformer, first, second and third rectifying-and-filtering circuits, and a voltage adjusting transformer.

The output transformer includes an input coil unit that is adapted for receiving the input voltage, and first and second output coil units. Each of the first and second output coil units is coupled electromagnetically to the input coil unit and is adapted for generating a respective first intermediate voltage from the input voltage.

The first rectifying-and-filtering circuit is connected electrically to the first output coil unit of the output transformer, and is adapted for rectifying and filtering the first intermediate voltage obtained from the first output coil unit into a first output voltage.

The voltage adjusting transformer includes a primary coil unit that is connected in parallel to the first output coil unit of the output transformer, and a secondary coil unit that includes two series-connected secondary coils. Each of the secondary coils is coupled electromagnetically to the primary coil unit so as to generate a respective second intermediate voltage from the first intermediate voltage obtained from the first output coil unit.

The second rectifying-and-filtering circuit is connected electrically to the second output coil unit of the output transformer and to a common node of the secondary coils of the secondary coil unit of the voltage adjusting transformer, and generates a first sub-output voltage.

The third rectifying-and-filtering circuit is connected electrically to the secondary coils of the secondary coil unit of the voltage adjusting transformer, and generates a second sub-output voltage.

The first and second sub-output voltages are combined to result in a second output voltage.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
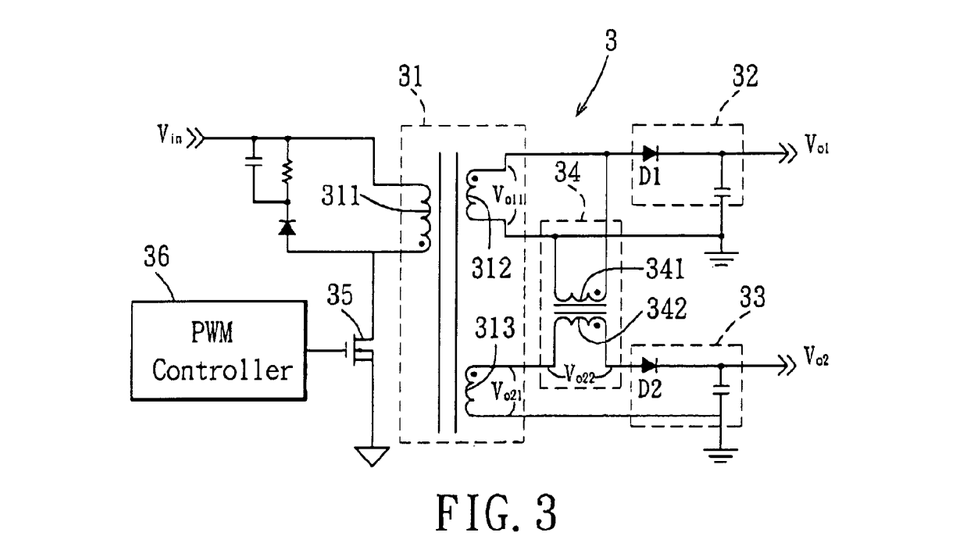
FIG. 3 is a schematic circuit diagram of the first preferred embodiment of a flyback type power supplying device according to the present invention.

With reference to FIG. 3, the first preferred embodiment of a power supplying device 3 according to the present invention is adapted for converting an input voltage ($V_{in}$) into two output voltages ($V_{o1}$, $V_{o2}$). The power supplying device 3 includes an output transformer 31, first and second rectifying-and-filtering circuits 32, 33, and a voltage adjusting transformer 34. In this embodiment, the power supplying device 3 is a flyback type power supplying device.

The output transformer 31 includes an input coil unit 311 that is adapted for receiving the input voltage ($V_{in}$), and first and second output coil units 312, 313. Each of the first and second output coil units 312, 313 is coupled electromagnetically to the input coil unit 311, and is adapted for generating a respective first intermediate voltage ($V_{o11}$, $V_{o21}$) from the input voltage ($V_{in}$) according to a turns ratio between the input coil unit 311 and the corresponding one of the first and second output coil units 312, 313. The turns ratios between the input coil unit 311 and the first and second output coil units 312, 313 are different in this embodiment.

In this embodiment, the input coil unit 311 has an undotted terminal (also known as a negative terminal) that is adapted to be connected electrically to the input voltage ($V_{in}$), and a dotted terminal (also known as a positive terminal) that is adapted to be connected to a transistor switch 35, which is controlled by a pulse width modulation (PWM) controller 36 for allowing the input voltage ($V_{in}$) to be received by the input coil unit 311 at suitable times.

The first rectifying-and-filtering circuit 32 is connected electrically to the first output coil unit 312 of the output transformer 31, and is adapted for rectifying and filtering the first intermediate voltage ($V_{o11}$) obtained from the first output coil unit 312 into a first output voltage ($V_{o1}$). In this embodiment, the first rectifying-and-filtering circuit 32 is connected in parallel to the first output coil unit 312.

The voltage adjusting transformer 34 includes a primary coil unit 341 and a secondary coil unit 342. The primary coil unit 341 is connected in parallel to the first output coil unit 312 of the output transformer 31. The secondary coil unit 342 is connected in series to the second output coil unit 313 of the output transformer 31, and is coupled electromagnetically to the primary coil unit 341 so as to generate a second intermediate voltage ($V_{o22}$) from the first intermediate voltage ($V_{o11}$) obtained from the first output coil unit 312. In this embodiment, the first and second output coil units 312, 313 of the output transformer 31 and the primary and secondary coil units 341, 342 of the voltage adjusting transformer 34 are forwardly connected, i.e., the dotted terminals thereof are all on the same side.

Therefore, the second output coil unit 313 generates the first intermediate voltage ($V_{o21}$) from the input voltage ($V_{in}$) according to the turns ratio between the second output coil unit 313 and the input coil unit 311, and the secondary coil unit 342 generates the second intermediate voltage ($V_{o22}$) from the first intermediate voltage ($V_{o11}$) obtained by the primary coil unit 341 from the first output coil unit 312 according to a turns ratio between the secondary coil unit 342 and the primary coil unit 341.

The second rectifying-and-filtering circuit 33 is connected to the secondary coil unit 342 of the voltage adjusting transformer 34 for rectifying and filtering a combined voltage that combines the second intermediate voltage ($V_{o22}$) obtained from the secondary coil unit 342 with the first intermediate voltage ($V_{o21}$) obtained from the second output coil unit 313 into a second output voltage ($V_{o2}$).

It can be seen from the above that by forwardly connecting the first and second output coil units 312, 313 of the output transformer 31 and the primary and secondary coil units 341, 342 of the voltage adjusting transformer 34, and by suitably designing the turns ratios between the second output coil unit 313 and the input coil unit 311 and between the primary and secondary coil units 341, 342, the second output voltage ($V_{o2}$), which is the rectified and filtered combined voltage of the first intermediate voltage ($V_{o21}$) and the second intermediate voltage ($V_{o22}$), can be made to satisfy the requirement of a load circuit (not shown) that is adapted to be connected to the power supplying device 3 of the present invention.

Figure 4:
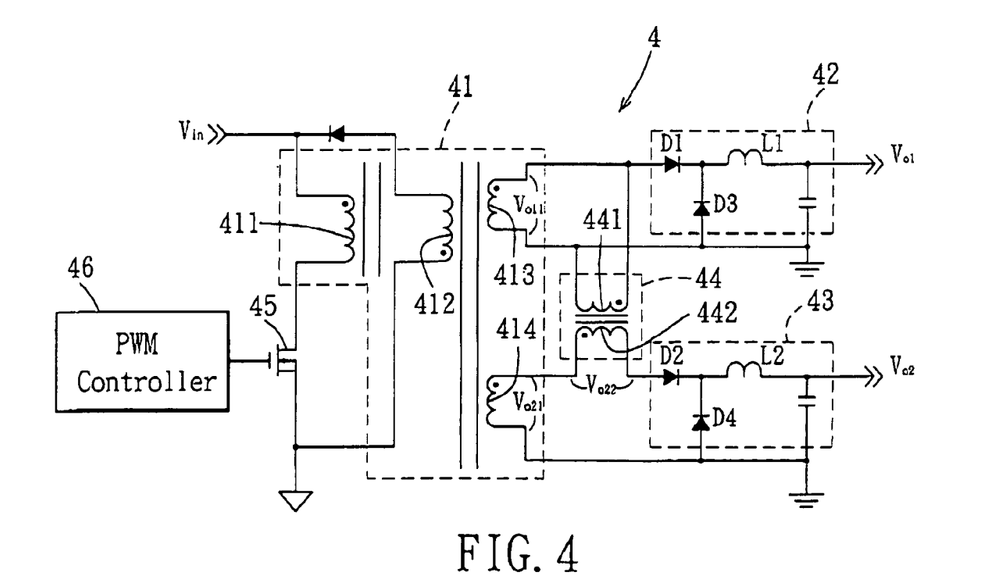
FIG. 4 is a schematic circuit diagram of the second preferred embodiment of a forward type power supplying device according to the present invention.

As shown in FIG. 4, the second preferred embodiment of a power supplying device 4 according to the present invention is a forward type power supplying device, and includes an output transformer 41, first and second rectifying-and-filtering circuits 42, 43, and a voltage adjusting transformer 44. The output transformer 41 includes an input coil unit 411, a set coil unit 412, and first and second output coil units 413, 414. The input coil unit 411 has a dotted terminal that is adapted to be connected to the input voltage ($V_{in}$), and an undotted terminal that is connected to a transistor switch 45, which is controlled by a PWM controller 46 for allowing the input voltage ($V_{in}$) to be received by the input coil unit 411 at suitable times.

Similar to the first preferred embodiment, the primary coil unit 441 of the voltage adjusting transformer 44 is connected in parallel to the first output coil unit 413 of the output transformer 41, and the secondary winding 442 of the voltage adjusting transformer 44 is connected in series between the second output coil unit 414 of the output transformer 41 and the second rectifying-and-filtering circuit 43. One difference between the first and second preferred embodiments resides in that the dotted terminal of the secondary coil unit 442 in the second preferred embodiment is reverse to that in the first preferred embodiment, i.e., the secondary coil unit 442 is reversely connected to the second output coil unit 414 of the output transformer 41. Therefore, the combined voltage rectified and filtered by the second rectifying-and-filtering circuit 43 is the first intermediate voltage ($V_{o21}$) obtained from the second output coil unit 414 reduced by the second intermediate voltage ($V_{o22}$) obtained from the secondary coil unit 442. In other words, the second intermediate voltage ($V_{o22}$) in effect reduces the second output voltage ($V_{o2}$).

It has been illustrated by the above preferred embodiments that forwardly connecting the secondary coil unit 342 of the voltage adjusting transformer 34 (shown in FIG. 3) results in an increase second output voltage ($V_{o2}$), and reversely connecting the secondary coil unit 442 of the voltage adjusting transformer 44 (shown in FIG. 4) results in a decreased second output voltage ($V_{o2}$).

Figure 5:
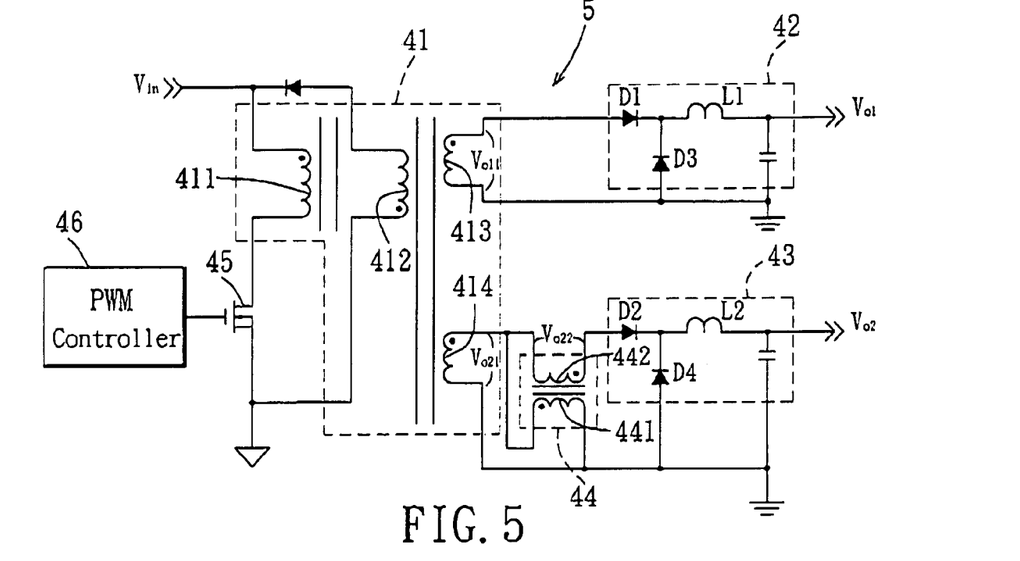
FIG. 5 is a schematic circuit diagram of the third preferred embodiment of a forward type power supplying device according to the present invention.

With reference to FIG. 5, the third preferred embodiment of a power supplying device 5 according to the present invention is a forward type power supplying device, and differs from the second preferred embodiment in the connection the voltage adjusting transformer 44. In particular, the primary coil unit 441 of the voltage adjusting transformer 44 is connected in parallel to the second output coil unit 414 of the output transformer 41, instead of the first output coil unit 413. In addition, the secondary coil unit 442 and the second output coil unit 414 are forwardly connected. As a result, the secondary coil unit 442, being coupled electromagnetically to the primary coil unit 441, generates a second intermediate voltage ($V_{o22}$) from the first intermediate voltage ($V_{o21}$) obtained from the second output coil unit 414 according to the turns ratios between the primary and secondary coil units 441, 442. Similar to the second preferred embodiment, the second rectifying-and-filtering circuit 43 rectifies and filters the combined voltage that combines the second intermediate voltage ($V_{o22}$) obtained from the secondary coil unit 442 with the first intermediate voltage ($V_{o21}$) obtained from the second output coil unit 414 into the second output voltage ($V_{o2}$).

It is evident from the second and third preferred embodiments that the primary and secondary coil units 441, 442 of the voltage adjusting transformer 44 not only can be connected respectively to the first and second output coil units 413, 414 of the output transformer 41 for utilizing the first intermediate voltage ($V_{o11}$) obtained from the first output coil unit 413 to adjust the first intermediate voltage ($V_{o21}$) obtained from the second output coil unit 414 so as to eventually result in the second output voltage ($V_{o2}$), both the primary and secondary coil units 441, 442 of the voltage adjusting transformer 44 can also be connected to the second output coil unit 414 of the output transformer 41 for utilizing the first intermediate voltage ($V_{o21}$) obtained from the second output coil unit 414 for adjustment so as to eventually result in the second output voltage ($V_{o2}$).

Figure 6:
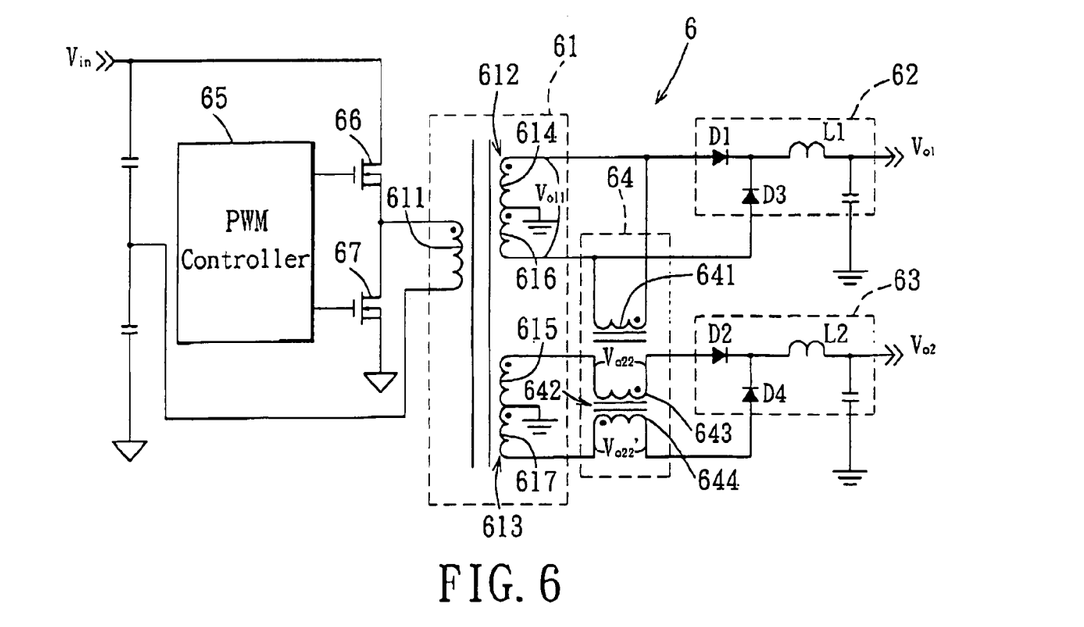
FIG. 6 is a schematic circuit diagram of the fourth preferred embodiment of a power supplying device that has a half-bridge circuit structure according to the present invention.

With reference to FIG. 6, the fourth preferred embodiment of a power supplying device 6 according to the present invention has a half-bridge circuit structure, and includes an output transformer 61, first and second rectifying-and-filtering circuits 62, 63, and a voltage adjusting transformer 64.

The output transformer 61 includes an input coil unit 611, and first and second output coil units 612, 613. The input coil unit 611 has a dotted terminal that is connected to two transistor switches 66, 67, which are controlled by a PWM controller 65 for allowing the input voltage ($V_{in}$) to be received by the input coil unit 611 at suitable times.

The power supplying device 6 differs from the third preferred embodiment in that each of the first and second output coil units 612, 613 of the output transformer 61 is center tapped (to ground) such that each of the first and second output coil units 612, 613 includes a first coil portion 614, 615 and a second coil portion 616, 617.

In this embodiment, the primary coil unit 641 of the voltage adjusting transformer 64 is connected in parallel to the first output coil unit 612 of the output transformer 61. The secondary coil unit 642 of the voltage adjusting transformer 64 includes two secondary coils 643, 644, each of which is connected in series between a corresponding one of the first and second coil portions 615, 617 of the second output coil unit 613 of the output transformer 61 and the second rectifying-and-filtering circuit 63, and is coupled electromagnetically to the primary coil unit 641 for generating a respective second intermediate voltage ($V_{o22}$, $V_{o22}'$) from the first intermediate voltage ($V_{o11}$) obtained from the first output coil unit 614.

Furthermore, the secondary coils 642, 643 are forwardly connected to the first and second coil portions 615, 617 of the second output coil unit 613. Consequently, the voltage obtained from the first coil portion 615 is combined with the voltage obtained from the secondary coil 643, and the voltage obtained from the second coil portion 617 is combined with the voltage obtained from the secondary coil 644 to in effect increase the second output voltage ($V_{o2}$).

Figure 7:
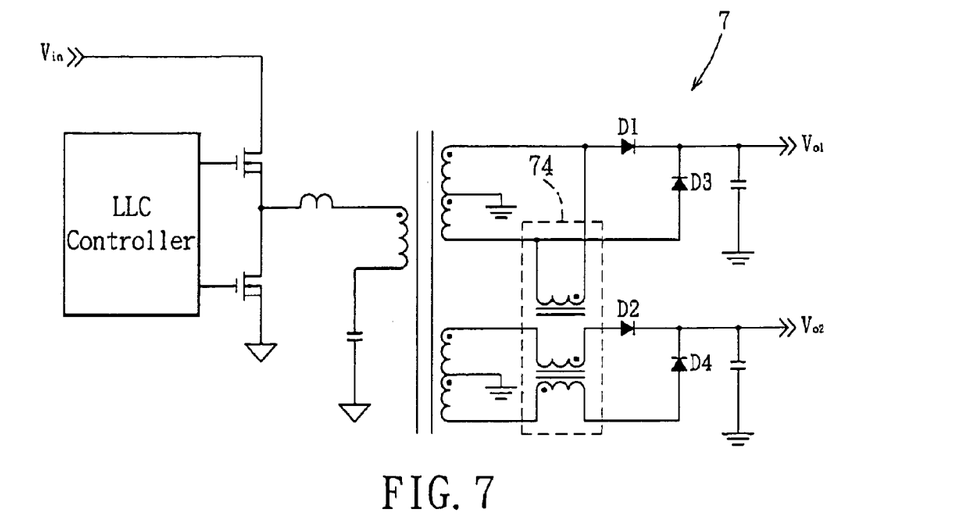
FIG. 7 is a schematic circuit diagram of the fifth preferred embodiment of a power supplying device that has a half-bridge LLC series-connected resonance circuit structure according to the present invention.

With reference to FIG. 7, the fifth preferred embodiment of a power supplying device 7 according to the present invention differs from the fourth preferred embodiment in that the power supplying device 7 has a half-bridge LLC series-connected resonance circuit structure. Since operation of the voltage adjusting transformer 74 in the power supplying device 7 of this embodiment is identical to that of the voltage adjusting transformer 64 in the power supplying device 6 of the fourth preferred embodiment, further details of the same are omitted herein for the sake of brevity.

Figure 8:
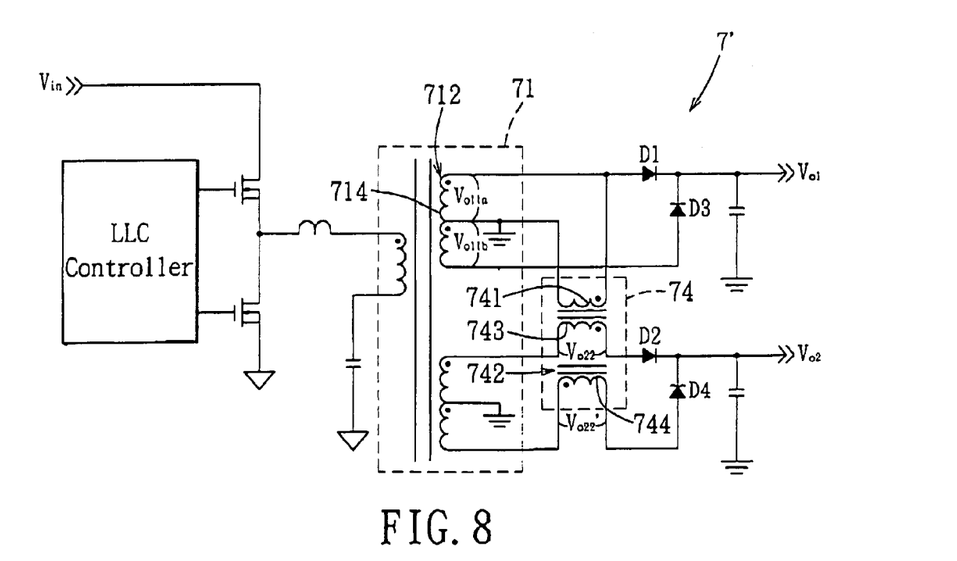
FIG. 8 is a schematic circuit diagram of the sixth preferred embodiment of a power supplying device that has a half-bridge LLC series-connected resonance circuit structure according to the present invention.

As shown in FIG. 8, the sixth preferred embodiment of a power supplying device 7' according to the present invention differs from the fifth preferred embodiment in that the primary coil unit 741 of the voltage adjusting transformer 74 is connected in parallel to the first coil portion 714 of the first output coil unit 712 of the output transformer 71. As a result, the secondary coils 743, 744 of the secondary coil unit 742 generate the second intermediate voltages ($V_{o22}$, $V_{o22}'$) from the voltage ($V_{o11a}$) obtained from the first coil portion 714 of the first output coil unit 712.

Figure 9:
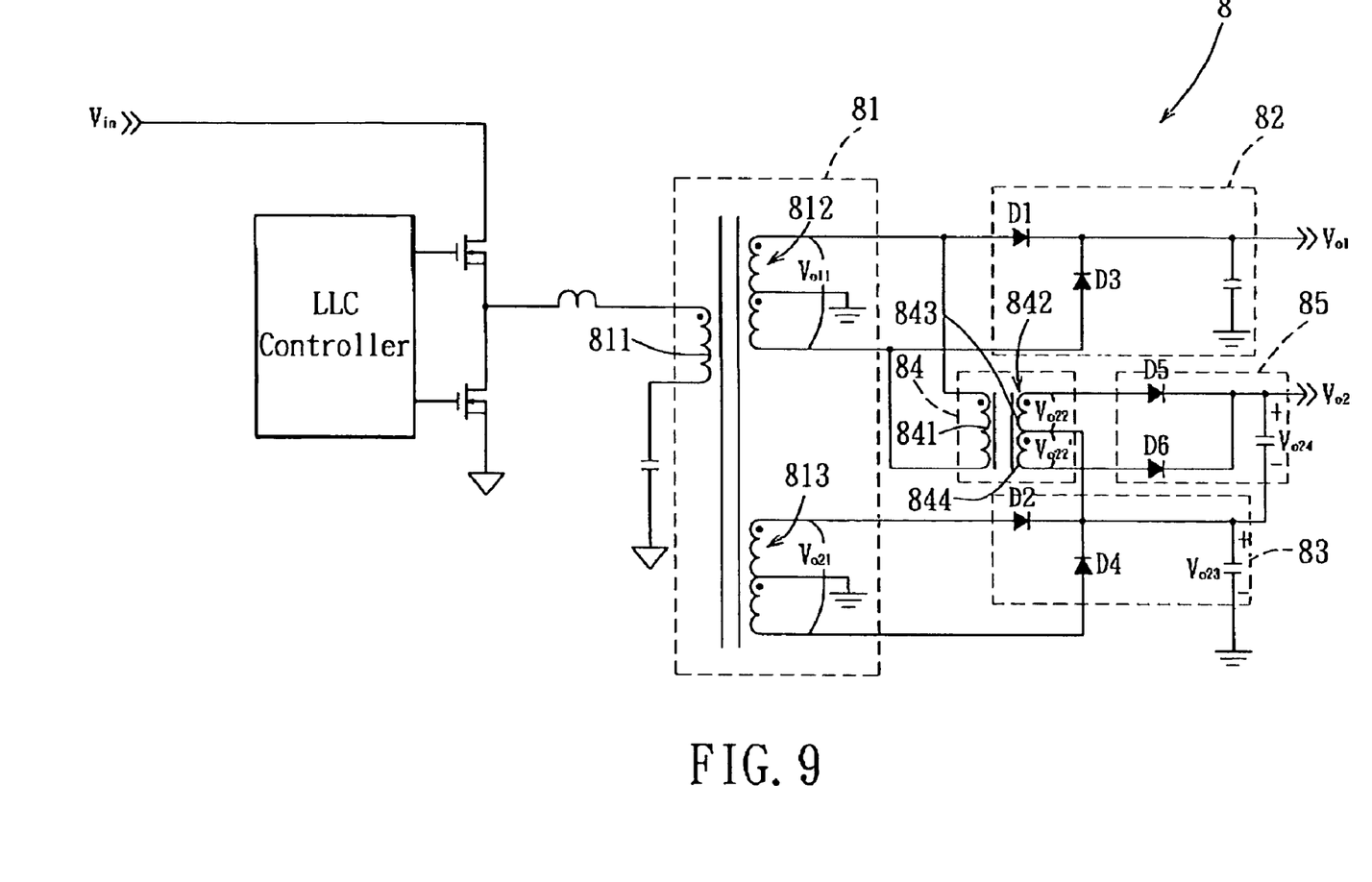
FIG. 9 is a schematic circuit diagram of the seventh preferred embodiment of a power supplying device that has a half-bridge LLC circuit structure according to the present invention.

With reference to FIG. 9, the seventh preferred embodiment of a power supplying device 8 according to the present invention includes an output transformer 81, first, second and third rectifying-and-filtering circuits 82, 83, 85, and a voltage adjusting transformer 84. In this embodiment, the power supplying device 8 has a half-bridge LLC circuit structure.

The output transformer 81 includes an input coil unit 811 that is adapted for receiving the input voltage ($V_{in}$) and first and second output coil units 812, 813, each of which is coupled electromagnetically to the input coil unit 811 and is adapted for generating a respective first intermediate voltage ($V_{o11}$, $V_{o21}$) from the input voltage ($V_{in}$).

The first rectifying-and-filtering circuit 82 is connected electrically to the first output coil unit 812 of the output transformer 81, and is adapted for rectifying and filtering the first intermediate voltage ($V_{o11}$) obtained from the first output coil unit 812 into a first output voltage ($V_{o1}$).

The voltage adjusting transformer 84 includes a primary coil unit 841 that is connected in parallel to the first output coil unit 812 of the output transformer 81, and a secondary coil unit 842 that includes two series-connected secondary coils 843, 844. Each of the secondary coils 843, 844 is coupled electromagnetically to the primary coil unit 841 so as to generate a respective second intermediate voltage ($V_{o22}$, $V_{o22}'$) from the first intermediate voltage ($V_{o11}$) obtained from the first output coil unit 812.

The second rectifying-and-filtering circuit 83 is connected electrically to the second output coil unit 813 of the output transformer 81 and to a common node of the secondary coils 843, 844 of the secondary coil unit 842 of the voltage adjusting transformer 84, and generates a first output sub-voltage ($V_{o23}$).

The third rectifying-and-filtering circuit 85 is connected electrically to opposite terminals of the secondary coils 843, 844 of the secondary coil unit 842, and generates a second output sub-voltage ($V_{o24}$).

The first and second output sub-voltages ($V_{o23}$, $V_{o24}$) are combined to result in a second output voltage ($V_{o2}$).

Figure 10:
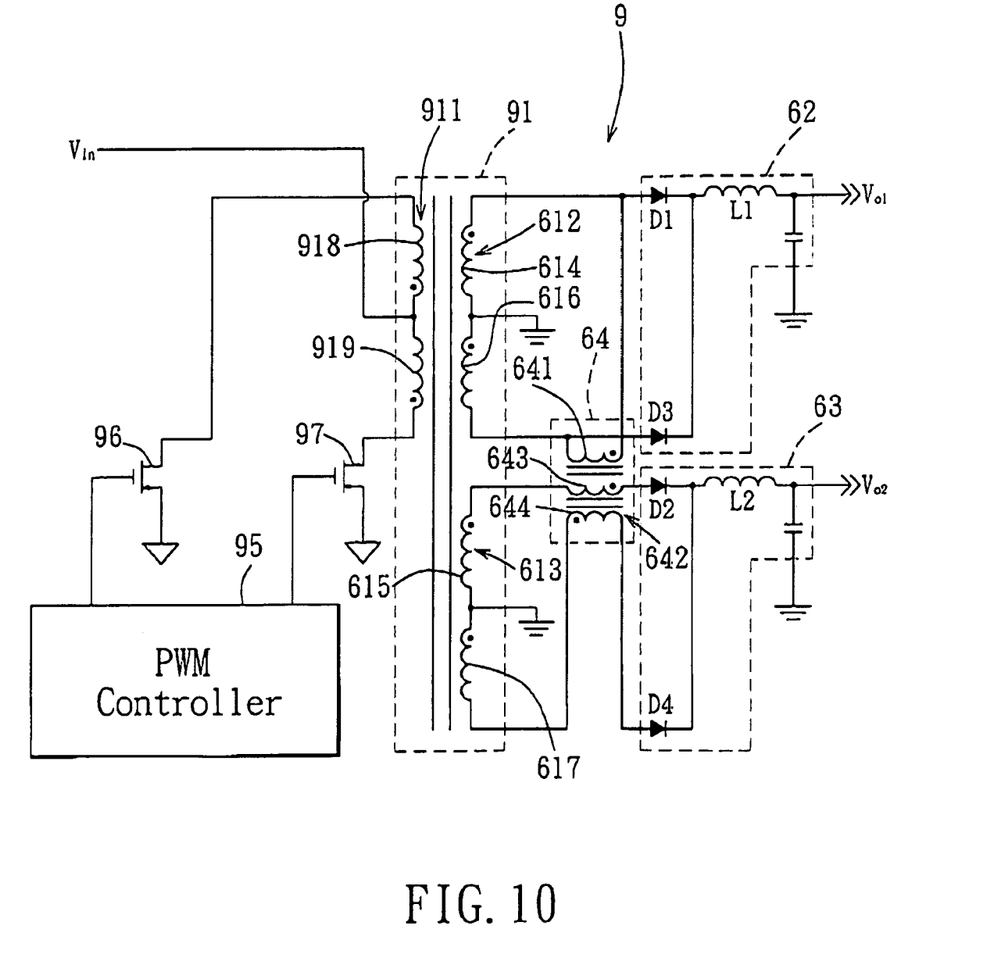
FIG. 10 is a schematic circuit diagram of the eighth preferred embodiment of a power supplying device that has a push-pull circuit structure according to the present invention.

With reference to FIG. 10, the eighth preferred embodiment of a power supplying device 9 according to the present invention has a push-pull circuit structure, and differs from the fourth preferred embodiment (shown in FIG. 6), in that the input coil unit 911 of the output transformer 91 includes a first input coil portion 918 and a second input coil portion 919 that are adapted to be connected to the input voltage ($V_{in}$) at a common terminal thereof, and that are connected respectively to transistor switches 96, 97 at the other terminals thereof. The transistor switches 96, 97 are connected to a PWM controller 95, which controls the transistor switches 96, 97 for determining which one of the first and second input coil portions 918, 919 is allowed to receive the input voltage ($V_{in}$). Since operations of the power supplying device 9 are identical to that of the fourth preferred embodiment, further details of the same are omitted herein for the sake of brevity.

Figure 11:
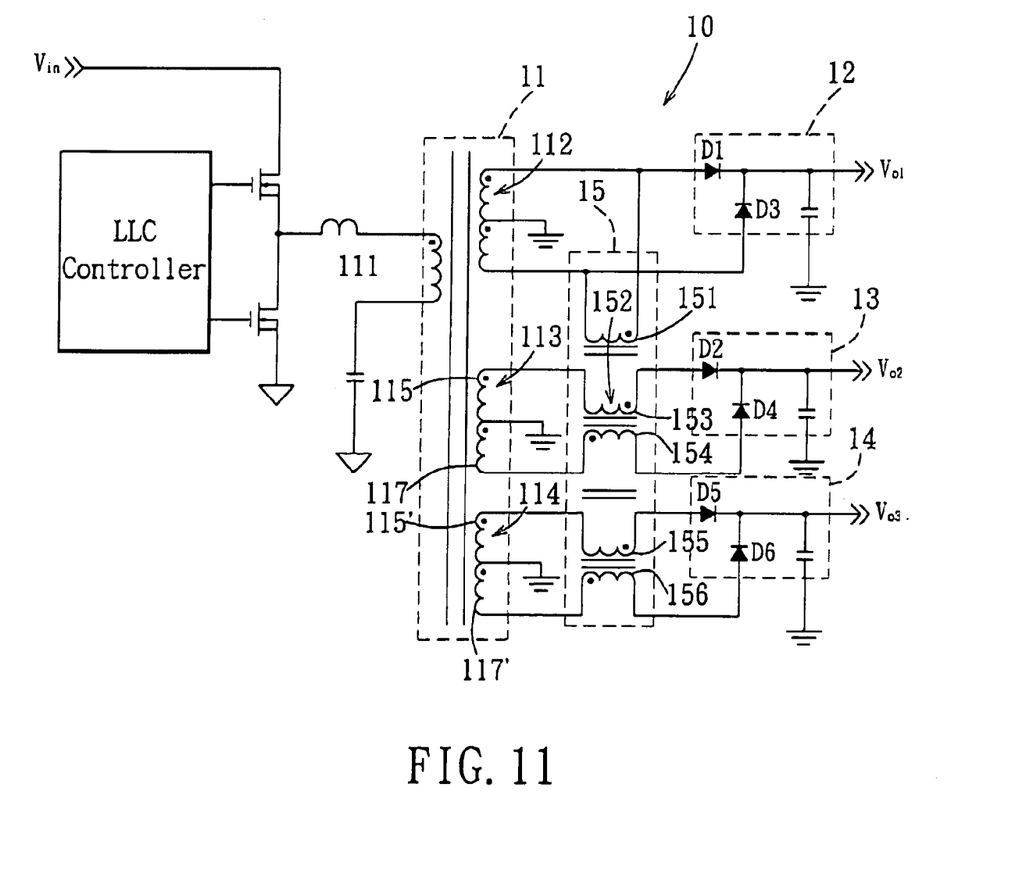
FIG. 11 is a schematic circuit diagram of the ninth preferred embodiment of a power supplying device that has a half-bridge LLC circuit structure according to the present invention.

With reference to FIG. 11, the ninth preferred embodiment of a power supplying device 10 according to the present invention has a half-bridge LLC circuit structure, and differs from the fifth preferred embodiment (shown in FIG. 7) in that the output transformer 11 further includes a third output coil unit 114 in addition to the input coil unit 111 and the first and second output coil units 112, 113. There is also a third rectifying-and-filtering circuit 14 in addition to the first and second rectifying-and-filtering circuits 12, 13. The first, second and third output coil units 112, 113, 114 have different turns ratios. The first, second and third rectifying-and-filtering circuits 12, 13, 14 respectively correspond to the first, second and third output coil units 112, 113, 114, and respectively output first, second and third output voltages ($V_{o1}$, $V_{o2}$, $V_{o3}$). In addition, in this embodiment, the voltage adjusting transformer 15 includes a primary coil unit 151 and a secondary coil unit 152, which includes four secondary coils 153, 154, 155, 156. Similar to the fourth preferred embodiment, each of the second and third output coil units 113, 114 has a first coil portion 115, 115' and a second coil portion 117, 117'. Each of the secondary coils 153, 154 is connected in series between a corresponding one of the first and second coil portions 115, 117 of the second output coil unit 113 and the second rectifying-and-filtering circuit 13, while each of the secondary coils 155, 156 is connected in series between a corresponding one of the first and second coil portions 115', 117' of the third output coil unit 114 and the third rectifying-and-filtering circuit 14. Since the manner in which the second and third cutout voltages ($V_{o2}$, $V_{o3}$) are generated is identical to that disclosed in the fourth preferred embodiment for the second output voltage ($V_{o2}$), further details of the same are omitted herein for the sake of brevity.

It is evident from the ninth preferred embodiment that by including a plurality of secondary coils 153~156 in the secondary coil unit 152, a single voltage adjusting transformer 15 is sufficient for generating a plurality of adjusted output voltages ($V_{o2}$, $V_{o3}$) according to the present invention.

In sum, although in most of the embodiments illustrated herein, the power supplying device 3~10, 7' is adapted for converting an input voltage ($V_{in}$) into two output voltages ($V_{o1}$, $V_{o2}$) with the second output voltage ($V_{o2}$) being adjusted by the voltage adjusting transformer 34, 44, 64, 74, 84, the power supplying device 11 of the present invention, as illustrated in the ninth preferred embodiment, is adapted for converting the input voltage ($V_{in}$) into more than two output voltages (three in the ninth preferred embodiment) with two of the output voltages ($V_{o2}$, $V_{o3}$) being adjusted by the voltage adjusting transformer 15 as required by the application. The number of output voltages generated by the power supplying device of the present invention is not limited to those disclosed hereinabove, and the number of voltages adjusted by the voltage adjusting transformer is also not limited to those disclosed hereinabove. In particular, the power supplying device may comprise an output transformer that includes any number of output coil units, and a voltage adjusting transformer that includes a secondary coil unit having any number of secondary coils depending on the number of output voltages required so that the output voltages satisfy the requirement of a load circuit adapted to be connected to the power supplying device.

Moreover, compared to the DC-DC converter 20 (shown in FIG. 1) and the linear regulator 30 (shown in FIG. 2) used in the prior art, the voltage adjusting transformer utilized in the power supplying device of the present invention is relatively low cost, has a relatively simple circuitry, and has a relatively high power converting efficiency (usually up to 98%) since the voltage adjusting transformer only involves magnetic losses and copper losses.

To summarize, the power supplying device of the present invention utilizes appropriately connected output transformer and voltage adjusting transformer (e.g., forwardly connected, reversely connected, etc.) and suitably designed turns ratios between the primary and secondary coil units of the voltage adjusting transformer so as to add or subtract the voltage obtained from the secondary coil unit of the voltage adjusting transformer to or from the voltage obtained from the output transformer, such that the voltage obtained from the output transformer is effectively increased or decreased to become the output voltage that satisfies requirements of the load circuit (not shown) to be connected to the power supplying device.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power supplying device adapted for converting an input voltage into at least one output voltage, said power supplying device comprising:
   an output transformer including an input coil unit that is adapted for receiving the input voltage, and first and second output coil units, each of said first and second output coil units being coupled electromagnetically to said input coil unit and being adapted for generating a respective first intermediate voltage from the input voltage;
   first and second rectifying-and-filtering circuits; and
   a voltage adjusting transformer including a primary coil unit and a secondary coil unit;
   wherein said first rectifying-and-filtering circuit is connected electrically to said first output coil unit of said output transformer, and is adapted for rectifying and filtering the first intermediate voltage obtained from said first output coil unit into a first output voltage,
   said primary coil unit of said voltage adjusting transformer being connected in parallel to said first output coil unit of said output transformer,
   said secondary coil unit of said voltage adjusting transformer being connected in series to said second output coil unit of said output transformer, and being coupled electromagnetically to said primary coil unit so as to generate a second intermediate voltage from the first intermediate voltage obtained from said first output coil unit,
   said second rectifying-and-filtering circuit being connected to said secondary coil unit of said voltage adjusting transformer for rectifying and filtering a combined voltage that combines the second intermediate voltage obtained from said secondary coil unit with the first intermediate voltage obtained from said second output coil unit into a second output voltage.

2. The power supplying device as claimed in claim 1, wherein said power supplying device is a flyback type power supplying device.

3. The power supplying device as claimed in claim 1, wherein said power supplying device is a forward type power supplying device.

4. The power supplying device as claimed in claim 1, wherein said power supplying device has a circuit configuration that is one of a half-bridge circuit structure, a full-bridge circuit structure, a half-bridge LLC series-connected resonance circuit structure, a full-bridge LLC series-connected resonance circuit structure, and a push-pull circuit structure;
   each of said first and second output coil units of said output transformer being center tapped such that each of said first and second output coil units includes a first coil portion and a second coil portion;
   said secondary coil unit of said voltage adjusting transformer including two secondary coils, each of which is connected in series between a corresponding one of said first and second coil portions of said second output coil unit of said output transformer and said second rectifying-and-filtering circuit.

5. The power supplying device as claimed in claim 1, wherein the input voltage is a direct-current voltage.

6. A power supplying device adapted for converting an input voltage into an output voltage, said power supplying device comprising:
   an output transformer including an input coil unit that is adapted for receiving the input voltage, and an output coil unit coupled electromagnetically to said input coil unit and adapted for generating a first intermediate voltage from the input voltage;
   a rectifying-and-filtering circuit; and
   a voltage adjusting transformer including a primary coil unit connected in parallel to said output coil unit of said output transformer, and a secondary coil unit connected in series between said output coil unit of said output transformer and said rectifying-and-filtering circuit, and coupled electromagnetically to said primary coil unit so as to generate a second intermediate voltage from the first intermediate voltage obtained from said output coil unit; and
   wherein said rectifying-and-filtering circuit rectifies and filters a combined voltage that combines the second intermediate voltage obtained from said secondary coil unit with the first intermediate voltage obtained from said output coil unit into a second output voltage.

7. The power supplying device as claimed in claim 6, wherein said power supplying device is a flyback type power supplying device.

8. The power supplying device as claimed in claim 6, wherein said power supplying device is a forward type power supplying device, and said input coil unit of said output transformer includes two input coils.

9. The power supplying device as claimed in claim 6, wherein said power supplying device has a circuit configuration that is one of a half-bridge circuit structure, a full-bridge circuit structure, a half-bridge LLC series-connected resonance circuit structure, a full-bridge LLC series-connected resonance circuit structure, and a push-pull circuit structure;
   said output coil unit of said output transformer being center tapped such that said output coil unit includes a first coil portion and a second coil portion;
   said secondary coil unit of said voltage adjusting transformer including two secondary coils, each of which is connected in series between a corresponding one of said first and second coil portions of said output coil unit of said output transformer and said rectifying-and-filtering circuit.

10. The power supplying device as claimed in claim 6, wherein the input voltage is a direct-current voltage.

11. A power supplying device adapted for converting an input voltage into at least one output voltage, said power supplying device comprising:

an output transformer including an input coil unit that is adapted for receiving the input voltage, and first and second output coil units, each of said first and second output coil units being coupled electromagnetically to said input coil unit and being adapted for generating a respective first intermediate voltage from the input voltage;

a first rectifying-and-filtering circuit connected electrically to said first output coil unit of said output transformer, and adapted for rectifying and filtering the first intermediate voltage obtained from said first output coil unit into a first output voltage;

a voltage adjusting transformer including a primary coil unit that is connected in parallel to said first output coil unit of said output transformer, and a secondary coil unit that includes two series-connected secondary coils, each of said secondary coils being coupled electromagnetically to said primary coil unit so as to generate a respective second intermediate voltage from the first intermediate voltage obtained from said first output coil unit;

a second rectifying-and-filtering circuit connected electrically to said second output coil unit of said output transformer and to a common node of said secondary coils of said secondary coil unit of said voltage adjusting transformer, and generating a first sub-output voltage; and a third rectifying-and-filtering circuit connected electrically to said secondary coils of said secondary coil unit of said voltage adjusting transformer, and generating a second sub-output voltage;

wherein said first and second sub-output voltages are combined to result in a second output voltage.

12. The power supplying device as claimed in claim 11, wherein said power supplying device has a LLC half-bridge circuit configuration.

* * * * *